United States Patent [19]

Bergman

[11] 4,143,868
[45] Mar. 13, 1979

[54] CENTERING PIN FOR AIR FLOAT MACHINE TOOL TABLES

[76] Inventor: Raymond A. Bergman, 107 E. Second St., Minster, Ohio 45865

[21] Appl. No.: 835,826

[22] Filed: Sep. 22, 1977

Related U.S. Application Data

[63] Continuation-in-part of Ser. No. 684,725, May 10, 1976, Pat. No. 4,058,885.

[51] Int. Cl.² .............................................. B23Q 7/00
[52] U.S. Cl. ........................................ 269/20; 29/559; 408/76
[58] Field of Search ............................. 269/20, 69–70, 269/321 A; 51/235; 29/559, 563, 33 P; 408/56, 67, 69, 71, 76

[56] References Cited

U.S. PATENT DOCUMENTS

| | | | |
|---|---|---|---|
| 2,885,915 | 5/1959 | Schurger | 269/20 X |
| 3,208,270 | 9/1965 | Hill | 408/76 X |
| 3,209,623 | 10/1965 | Schardt | 269/20 X |
| 3,253,665 | 5/1966 | Schienle | 408/76 X |
| 3,376,764 | 4/1968 | Schardt | 51/235 |
| 3,588,989 | 6/1971 | Mosea | 29/559 X |
| 3,693,965 | 9/1972 | Mitsengendler | 269/20 |
| 3,807,035 | 4/1974 | Moorman et al. | 408/76 X |

Primary Examiner—Robert C. Watson
Attorney, Agent, or Firm—Albert L. Jeffers; John F. Hoffman

[57] ABSTRACT

A centering pin for use in a machine tool work table of the type in which a workpiece fixture is supported on a film of pressurized air thereby enabling substantially friction free movement of the fixture on the table surface. The centering pin comprises an outer pin mounted within the table and projecting above the table upper surface, an inner pin received within the outer pin for reciprocal movement along a direction generally normal to the table surface, a hydraulic actuator for causing the inner pin to project above the outer pin at a first vertical position, and a spring for causing the inner pin to retract to a second vertical position below the first vertical position when the fluid actuator is deactivated. The fixture has one or more slots which ride over the outer pin and a plurality of holes within the slots which are adapted to be engaged by the inner pin when it is extended to its upper vertical position, thereby enabling controlled translation and rotation of the fixture on the table. A safety feature is provided wherein if the slot is not engaged by the outer pin when the fixture is placed on the table, air floatation pressure cannot be supplied between the fixture and table surface.

23 Claims, 10 Drawing Figures

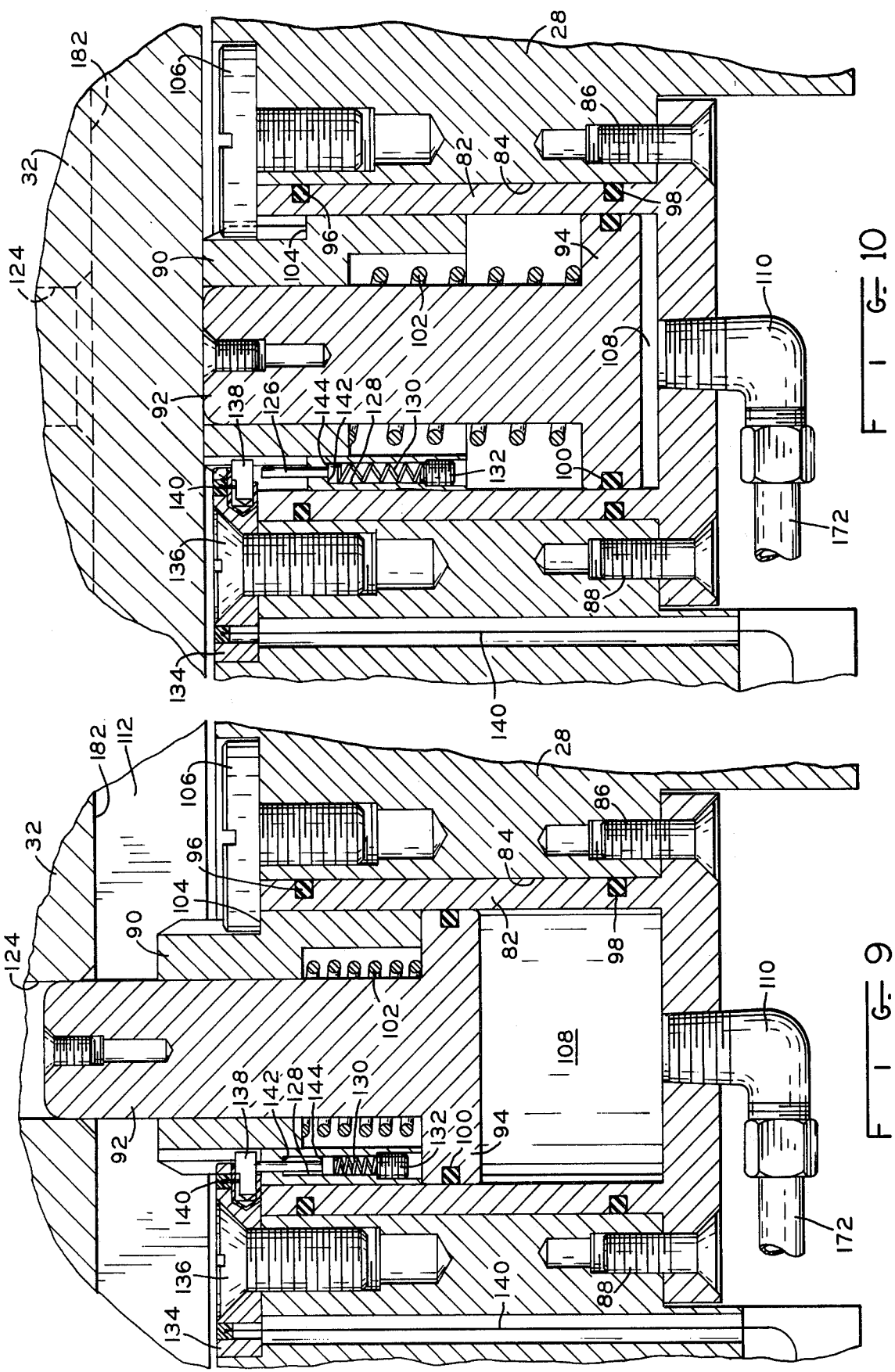

CENTERING PIN FOR AIR FLOAT MACHINE TOOL TABLES

CROSS REFERENCE TO RELATED APPLICATION

This is a continuation-in-part of copending patent application Ser. No. 684,725 filed May 10, 1976 now U.S. Pat. No. 4,058,885.

BACKGROUND OF THE INVENTION

The present invention relates to means for locating a workpiece fixture on a table during movement thereof from one machining position to another and in particular to a dual centering pin apparatus which selectively engages one or more slots and openings on the downwardly facing surface of the fixture so as to provide controlled translation and rotation thereof.

In standard machining practice, the machining of workpieces of any substantial size involves time consuming, laborious repositioning of the workpiece as various regions of the work are to be machined. Often, it becomes necessary to use hoists and other power devices for elevating and moving the workpiece about and for lowering the workpiece into the proper position for the machining of respective regions of the workpiece. Additionally, precise positioning of the workpiece in a selected position under such conditions is difficult and cannot always be achieved with the desired accuracy.

In order to overcome these problems, an air float table wherein the workpiece is supported on a film of pressurized air has been developed. Such a table, which is described in the aforementioned copending patent application Ser. No. 684,725, is provided with fluid passages and a plurality of fluid outlets distributed over the surface of the table so that a cushion of pressurized air may be provided underneath the workpiece fixture. By virtue of the fluid pressure film, substantially friction free movement of the fixture on the table is possible thereby permitting positioning and repositioning to be accomplished by a single operator without the need for extraneous hoisting equipment.

In order for the fixture to be rotated and translated from one position to another, the table may be provided with a main pivot pin which projects upwardly from the table surface. The pin may be receivable in a socket in the bottom of the fixture in which case the fixture is constrained to move circularly on the table. Alternatively, the socket may be replaced by a slot so that the fixture is not only rotatable on the bed but is translatable thereon in various desired directions. Cooperating elements of retractable pin and socket locating devices on the fixture and table provide for location of the fixture in predetermined positions on the table. Clamps are also provided to clamp the fixture in the located positions on the table during machining.

Although an air float system of this type is advantageous in repositioning heavy workpieces, there are certain attendant dangers which result from the substantially friction free relationship between the workpiece fixture and the table surface. For example, the workpiece and fixture can slide off the table if the operator does not exercise extreme caution during repositioning to assure that he has it fully under control. The tremendous masses of large workpieces and the high momenta which result when they are moved, however, make it difficult to stop the workpiece manually. Obviously, the potential for injury to the operator and damage to the workpiece and machine is very great.

Another problem is that of accurately stopping the workpiece at the desired position for subsequent engagement of the locating pins and sockets. The operator must therefore search for the desired position through repeated trial and error thereby resulting in a loss of productive machining time. In the case where the fixture is provided with a pair of crossed slots for dual translation, it is difficult for the operator to determine when the centering pin is located at the intersection of the two slots so that movement from one slot to the other can be accomplished. Accurately located rotation centers at various locations within the slots is also desirable for multiple machining operations.

SUMMARY OF THE INVENTION

The present invention overcomes the disadvantages of the prior art by providing a dual centering pin received within the table and comprising an outer pin which is engagable with the fixture slots, and inner pin received within the outer pin, and means for causing the inner pin to extend upwardly out of the outer pin so as to engage holes in the slots. When the inner pin is retracted, the workpiece fixture is translatable on the table in engagement with the outer pin and when the inner pin is extended and received within one of the fixture holes, the fixture may be rotated thereabout to the desired position. By providing a plurality of intersecting slots and a plurality of holes at various positions within the slots, a variety of rotation centers and translation paths are possible.

The outer pin may be slidably received in the table and in this case sensing means are provided to prevent the supplying of pressurized air between the fixture and table when the outer pin is depressed, as in the case where the fixture is lowered on the table with the slot out of alignment with the centering pin. If air pressure were applied without the fixture positively engaged by the centering pin, it could slide off the table and cause injury to the operator or damage to the workpiece or machine.

Specifically, the present invention is particularly adapted for use in apparatus for supporting a work member in a machine tool for machining thereof having a table with a horizontal upper surface adapted to support a workpiece fixture thereon and means for supplying fluid under pressure between the table and fixture. It comprises an outer pin mounted within the table and projecting above the table upper surface, an inner pin being received within the outer pin for movement along a direction generally normal to the table surface, and means for selectively causing the inner pin to project above the outer pin at a first vertical position and alternatively for causing the inner pin to retract to a second vertical position below the first vertical position. In the case where the outer pin is slidably received in the table for rectlinear movement along a direction normal to the table surface, a safety feature is provided comprising means for interrupting the supply of fluid under pressure between the table and workpiece fixture supported thereon when the outer pin is depressed below a given vertical height relative to the table surface.

The method according to the present invention relates to locating a workpiece fixture having a downwardly facing bottom surface, a slot in the bottom surface and a hole in the slot, in a machine tool, for example having a table with an upwardly facing upper surface for supporting the fixture during machining of the workpiece and a first pin extending upwardly out of the table surface. The method comprises: supporting a fixture on the table with the table and fixture surfaces in facing relationship and with pin received in the slot, supplying a fluid under pressure between the fixture and table surfaces to provide substantially friction free support of the fixture on the table, causing a second pin having a smaller diameter then the first pin to project upwardly out of the first pin and urge against the fixture slot, moving the fixture on the table such that the slot slides over the first pin until the second pin engages the hole in the fixture, rotating the fixture about the second pin to a predetermined position on the table, and causing at least one pair of locating elements on the table and fixture surfaces to interengage so as to lock the fixture in the predetermined position on the table.

It is an object of the present invention to provide a dual centering pin which is always in engagement with the fixture slot or slots and is selectively engagable with holes in the fixture slots so as to provide a plurality of rotating centers.

Another object of the present invention is to provide a dual centering pin apparatus wherein the supply of pneumatic pressure between the fixture and table is blocked when the centering pin and fixture are not interengaged for controlled horizontal movement.

A further object of the present invention is to provide a dual centering pin which enables rapid and accurate repositioning of the workpiece from one machining position to another.

Another object of the present invention is to provide a dual centering pin which may be easily incorporated into existing air float machine tool tables.

These and other objects and features of the present invention will become more apparent upon reference to the detailed description taken in conjunction with the accompanying drawings.

BRIEF DESCRIPTION OF THE DRAWINGS

FIG. 9 is an enlarged sectional view of the centering pin in its fully extended position; and FIG. 10 is an enlarged sectional view of the centering pin which has been depressed by the workpiece fixture.

DESCRIPTION OF THE PREFERRED EMBODIMENT

Figure 1:
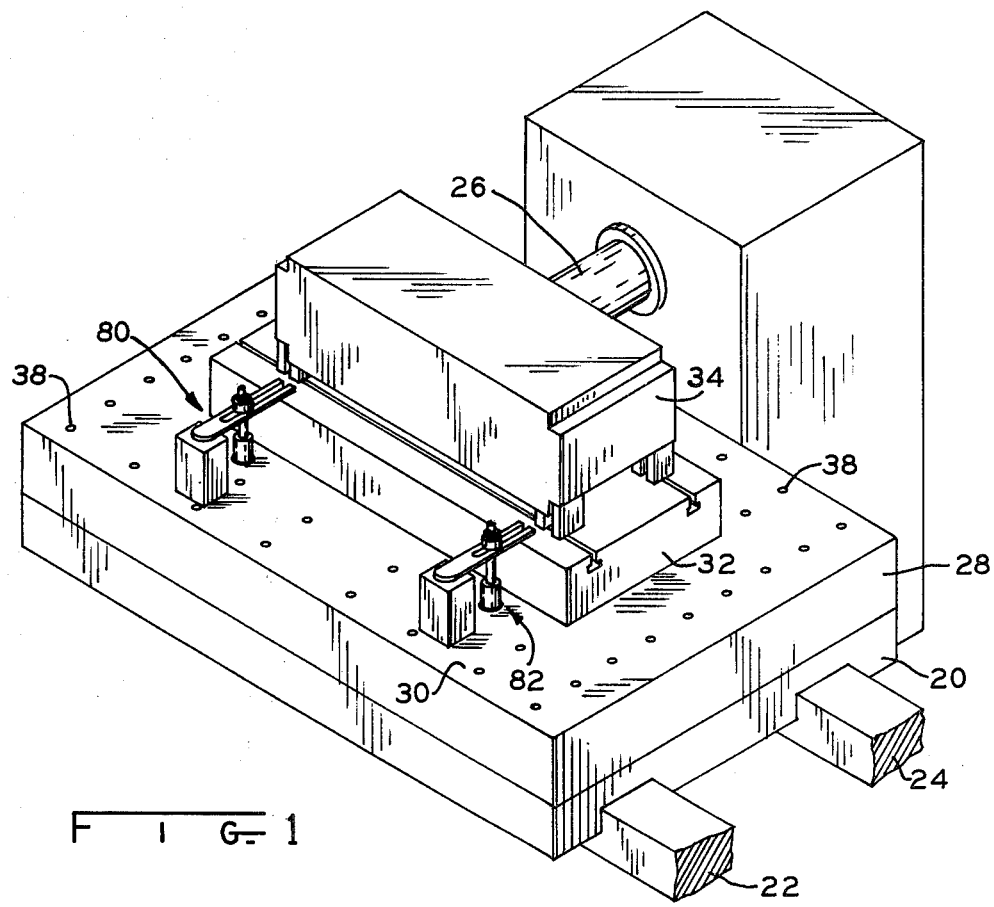
FIG. 1 is a perspective view of a machine tool incorporating the centering pin of the present invention.

Referring now to the drawings, FIG. 1 is a perspective view of a machine tool having a bed 20 supported on ways 22 and 24 and a working tool 26, which may be a boring tool, milling tool or the like according to well known practice in the machine tool art. A table or plate 28 is fixedly secured to bed 20 and includes an upper surface 30 on which is supported a workpiece fixture 32 having a workpiece 34 mounted thereon.

Figure 3:
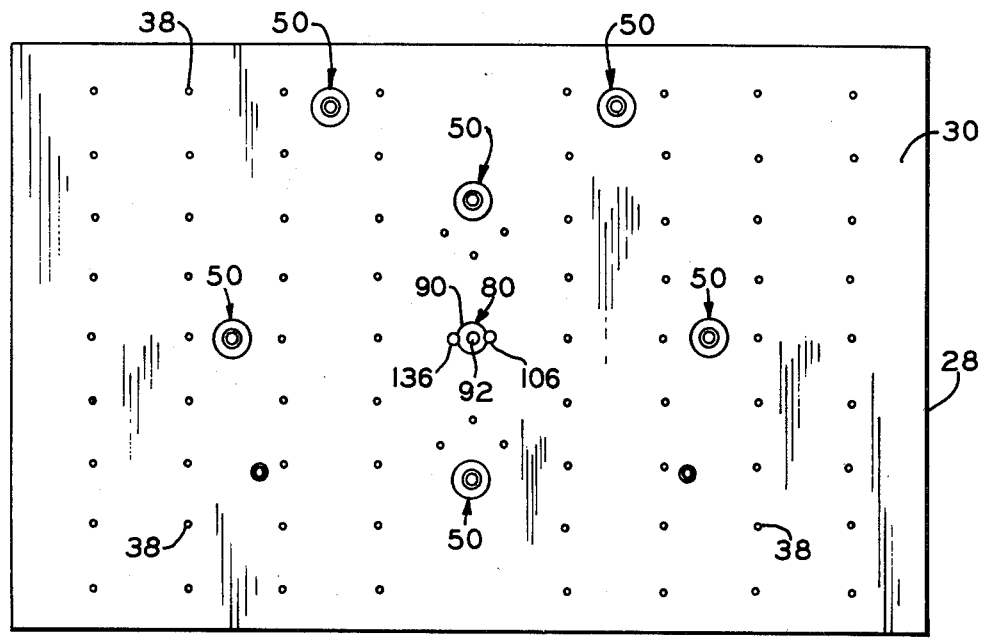
FIG. 3 is a top plan view of the table shown in FIG. 1.
Figure 7:
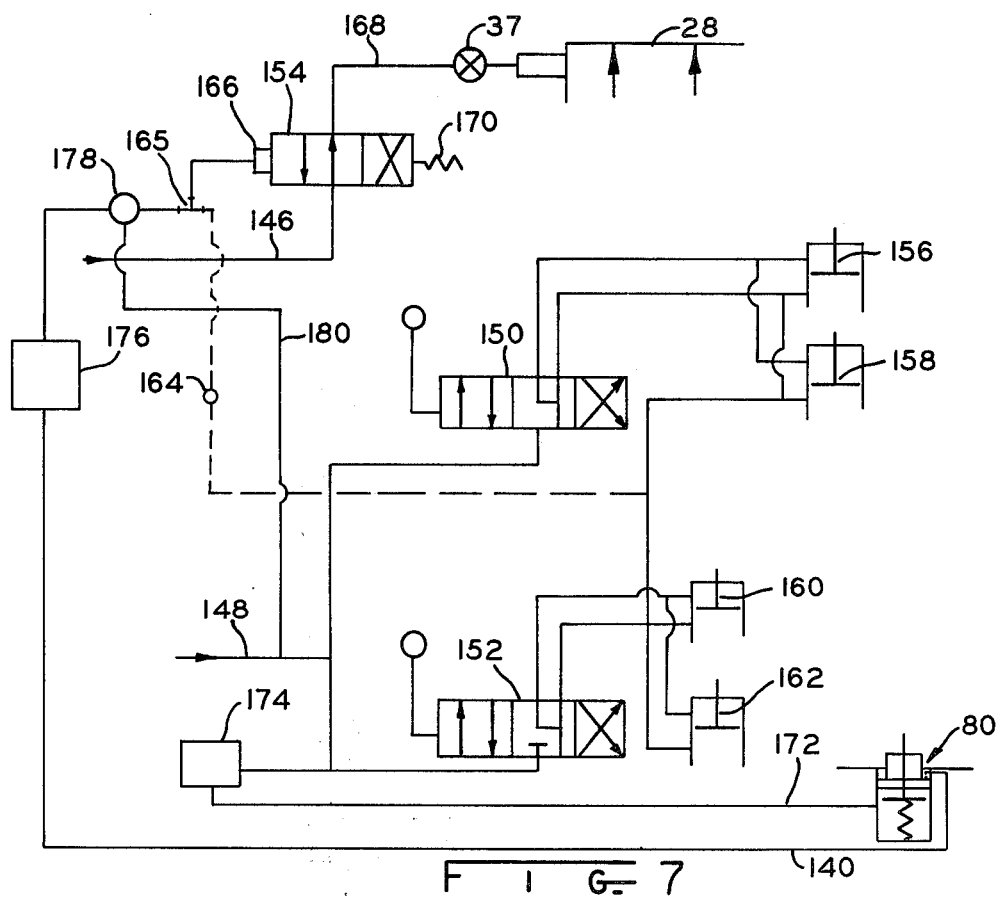
FIG. 7 is a schematic of the hydraulic system according to the invention.
Figure 5:
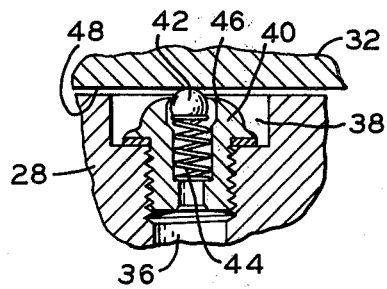
FIG. 5 is a sectional view of one of the valved connections leading from a passage in the table to the surface on which the workpiece fixture is supported.

Table 28 is provided with a plurality of fluid passageways 36 (FIG. 5) which are connected via a control valve 37 (FIG. 7) with a supply of fluid under pressure. The fluid is preferably air, but could conceivably comprise other fluid media. Passageways 36 extend upwardly through table 28 and communicate with openings 38 in the surface 30 of table 28. As shown in FIG. 3, there are many such openings 38 distributed over the table surface 30 so as to provide a film of pressurized air wherever the fixture 32 is positioned. The upper end of each passageway is closed by a valve comprising a body 40 which may be threaded into passageway 36 and the top of which is disposed slightly below the level of table surface 30. Valve body 40 is tubular and has captured therein a valve ball 42 which projects slightly above the surface 30 of table 28 as shown in FIG. 5. A spring 44 urges ball 42 into its upper closed position in which it contacts circular valve seat 46.

When the fixture 32 is moved on table 28 and the downwardly facing surface 48 of fixture 32 engages ball 42, ball 42 will be depressed as shown in FIG. 5 and admit air under pressure from passageway 36, between seat 46 and ball 42 to the space between surfaces 48 and 30. The pressure of the fluid is so adjusted that a fluid film will be established which will floatingly support fixture 32 thereon. This enables the fixture to be easily moved about on table 28 to the desired position. Obviously, when the supply of fluid is interrupted, fixture 32 will come to rest directly on table surface 30. Each opening 38 includes a valve identical to that shown in FIG. 5.

It is essential that the workpiece 34 be accurately located for machining, and to this end, table 28 includes a plurality of locating pins 50 which serve to lock the fixture in various predetermined positions. The locating pins 50 are located in precise positions on table 28 with reference to tool 26. These pins 50 are engageable with sockets 52 in the bottom surface 48 of fixture 32 and which are also accurately located within fixture 32 with reference to the location of pins 50. Thus, when one or more pins 50 engage the corresponding sockets 52, the fixture 32 will be in an accurately located position on table 28.

Figure 6:
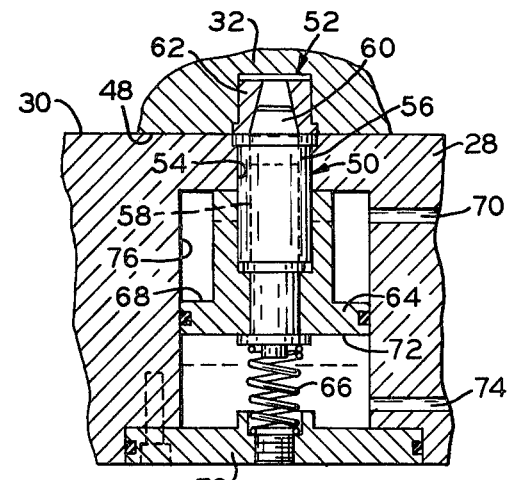
FIG. 6 is a sectional view of one of the locating pins shown engaged with a corresponding socket in the lower surface of the workpiece fixture.

Table 28 is provided with bores 54 each of which at the upper end thereof has an elongated bushing 56. Pin 58, having a tapered upper end 60 adapted for seating in the corresponding tapered bushing 62 in socket 52, is slidably received in bushing 56. At the lower end thereof, pin 58 is connected to a double acting position 64 biased upwardly by spring 66 to the position shown in FIG. 6. Each piston 64 has an upwardly facing fluid surface 68 adapted to be acted on by fluid from passageway 70 to drive the piston 64 and pin 58 downwardly until the upper end 60 of pin 58 is below the upper surface 30 of table 28. Alternatively, a supply of fluid pressure to the downwardly facing surface 72 from passageway 74 will drive piston 64 upwardly to effect firm engagement of the tapered end 60 with bushing 62. The lower end of bore 76 is closed by a cover plate 78. As shown in FIG. 3, table 28 is provided with a plurality of locating pins 50 so that a number of successive machining positions for workpiece 34 and fixture 32 may be realized.

By supplying air under pressure to the upper side 68 of piston 64, pin 58 will be moved downwardly out of bushing 62. If fluid under pressure is then introduced between fixture 32 and table 28, fixture 32 may be moved to the desired position. With fixture 32 in this position, pneumatic pressure is vented from passageway 70 and pin 58 will move upwardly under the pressure of spring 66 until its tapered portion 60 engages bushing 62. Pin 58 may be driven with more force into bushing 62 by admitting pressure through passageway 74. With the fixture 32 accurately located in this manner, the supply of pneumatic pressure between fixture 32 and table 28 is then terminated and fixture 32 will come to rest on surface 30. Fixture 32 may be clamped to table 28 by means of bayonet clamps 80, and 82 which are shown generally in FIG. 1 and described in greater detail in applicant's copending patent application entitled Bayonet Clamping Apparatus For Machine Tools. Additional details relating to the above-described aspects of the air float table may be found in the previously identified patent application Ser. No. 684,725. now U.S. Pat. No. 4,058,885.

Figure 8:
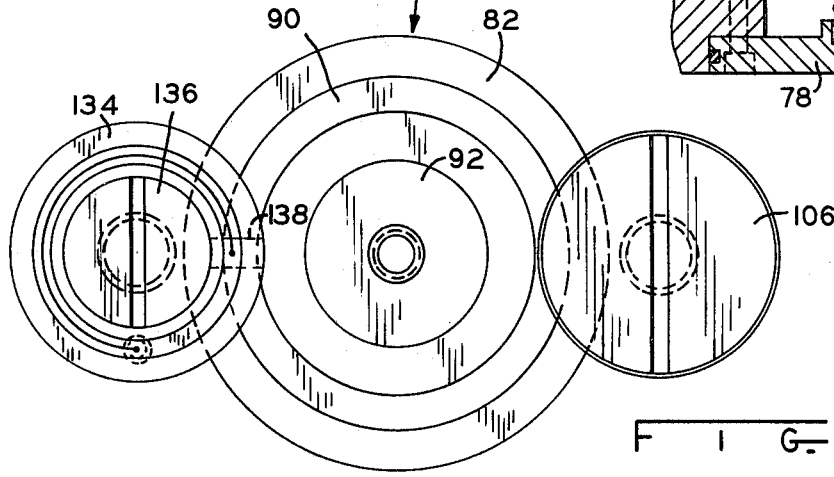
FIG. 8 is an enlarged plan view of the centering pin.

The centering pin 80 according to the present invention is shown in detail in FIGS. 8, 9 and 10. It comprises a cylinder 82 which is received within bore 84 in table 28 and secured thereto by means of screws 86 and 88, a generally tubular outer pin 90 reciprocally received within cylinder 82, and an inner pin 92 reciprocally received within outer pin 90 and cylinder 82 and having a flanged piston portion 94 at its lower end. O-rings 96 and 98 seal cylinder 82 against bore 84 and seal 100 seals piston 94 against cylinder 82.

A coil spring 102 is positioned around inner pin 92 and, when compressed, urges piston 94 and therefore pin 92 downwardly and outer pin 90 upwardly. The upward displacement of outer pin 90 is limited by shoulder 104 coming into contact with screw 106 and ring 134. Pressurized fluid, either a hydraulic fluid or air, is admitted to the working chamber 108 of cylinder 82 through fitting 110.

Figure 4:
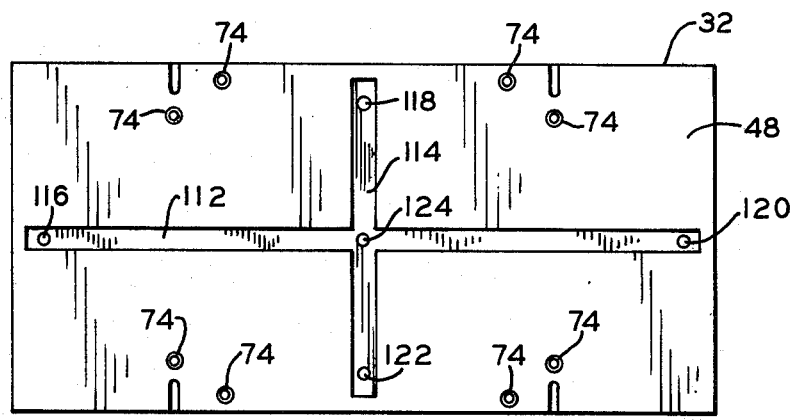
FIG. 4 is a bottom plan view of the workpiece fixture.

Referring now to FIG. 4, the lower surface 48 of fixture 32 is provided with a pair of intersecting slots 112 and 114 which terminate short of the edges of fixture 32, and a plurality of holes 116, 118, 120, 122 and 124 in slots 112 and 114. Although the exact location of holes 116 through 124 depends upon the particular machining requirements, it is generally preferable that at least one hole 124 be located at the intersection of the slots 112 and 114. When pins 90 and 92 are fully extended as shown in FIG. 9, outer pin 90 will be received in one of the slots 112 or 114 and inner pin 92 will engage one of the holes 116 through 124, fixture 32 can be rotated about the particular hole so engaged. With inner pin 92 retracted to a vertical position below holes 116 through 124, fixture 32 may be translated along one of its slots 112 or 114, which is in engagement with outer pin 90. It should be noted that even though inner pin 92 may be retracted as by interrupting the supply of fluid under pressure to chamber 108, outer pin 90 will remain in fully extended position unless physically depressed by an external force, such as the lower surface 48 of fixture 32.

In order to assure that fixture 32 can never accidently slide off table 28, a safety feature, which interrupts the supply of pressurized fluid between fixture 32 and table 28 when outer pin 90 is depressed, is provided. As shown in FIGS. 8, 9 and 10, it comprises: an electrically conductive plunger 126 reciprocally received within a bore 128 in outer pin 90 and urged upwardly by compressed spring 130 retained within bore 128 by plug 132, an electrically non-conductive ring 134 secured to table 28 by screw 136, a metal contact plug 138 received within ring 134 and connected to an insulated electrical wire 140. As long as outer pin 90 is extended so that it is at least partially received within slot 112 or slot 114, metal plunger 126 will contact plug 138 through the action of compressed spring 130. Once outer pin 90 has been depressed to a vertical height at or near the level of table surface 30, its shoulder 142 will engage the shoulder 144 of plunger 126 and force it downwardly out of contact with plug 138 as shown in FIG. 10. As will be described in greater detail in connection with FIG. 7, this causes the supply of pneumatic pressure between fixture surface 48 and table surface 30 to be blocked so that fixture 32 cannot accidently slide off table 28.

A simplified representation of the hydraulic and electric circuits in connection with the safety interlock described above is shown in FIG. 7. A source of fluid under pressure is supplied through conduits 146 and 148 to the fluid inlets of valves 150, 152 and 154. Valves 150 and 152 are three-position valves and operable for reversibly connecting the fluid inlet to one or the other of the surface conduits connected thereto while exhausting the other surface conduit, and also include a center position in which both of the service conduits are connected to exhaust. Valve 150 has one service line connected to the upwardly facing sides of a pair of locating pin actuating pistons 156 and 158 and the other service line connected to the downwardly facing side of the pistons 156 and 158. Similarly, valve 152 has one service line connected to the upwardly facing sides of pistons 160 and 162 for the locating pins 50 and the other service conduit connected to the downwardly facing sides of the pistons 160 and 162.

The conduits leading to the downwardly facing sides of the pistons 156 through 162 are connected through needle valves (not shown), if desired, a check valve 164 and selector valve 165 to a pilot cylinder 166 on reversing valve 154. Valve 154 is normally held in position to supply pressure to conduit 168 by spring 170 but will move into position to exhaust conduit 168 when the pressure in pilot cylinder 156 reaches a predetermined amount. Thus, when valves 150 and 152 are actuated to drive the locating pin 50 upwardly into locating position, after the pins 50 become seated, the pressure built up on the underneath sides of the pistons 156 through 162 will cause valve 154 to shift to interrupt the supply to the fluid cushion for fixture 32. Of course, the sequence of steps could be entirely under the control of manual valves, if so desired.

Centering pin 80 is supplied with fluid pressure through conduit 172 under the control of valve 174. Wire 140 is connected to a ground sensing device 176 which in turn is connected to solenoid valve 178. Ground sensing device 176 is adapted to provide a first output when wire 140 is isolated from electrical ground and a second electrical output when wire 140 is connected to ground. An exemplary detector is the Minster Micro-current Detector Unit Bul-010-6056 described in technical bulletin No. 105 of the Minster Machine Company, Minster, Ohio. Solenoid valve 178 is in fluid communication with pilot cylinder 166 through bellows selector valve 165.

As long as outer pin 90 is in a vertical position such that it is capable of engaging slots 112 and 114, wire 140 will be connected to ground through plug 138, plunger 126, outer pin 90, cylinder 82 and table 28, the latter being at ground potential. Ground sensing device 176 senses this condition and causes solenoid valve 178 to block fluid pressure from conduit 180 from reaching selector valve 165. This permits reversible valve 154 to remain in the position shown in which air under pressure is supplied to table surface 30 through conduit 168, valve 37 and passageways 36. Should outer pin 90 be depressed, for example if the fixture 32 were lowered onto table 28 without one of slots 112 or 114 being positioned over pin 90, plunger 126 will be moved out of contact with plug 138 so that ground sensing device 176 would detect a no-ground condition. In this case, solenoid valve 178 would admit pressurized fluid from conduit 180 to pilot cylinder 166 which would shift valve 154 to the closed position thereby interrupting the supply of fluid pressure to table 28. It should be noted that even though inner pin 92 may be retracted, outer pin 90 will remain extended unless physically depressed.

To illustrate the functioning of the present apparatus, a series of positioning operations will be described. Assume that the fixture 32 has been lowered on the table with one of its slots 112 or 114 aligned with outer pin 90 so that the latter remains extended as shown in FIG. 9. Pressurized air is then admitted to table 28 through valve 154, conduit 168, valve 137 and passageways 38 so that the fixture 32 "floats" on a thin film of air above table surface 30. Fixture 32 cannot slide off table 28 due to the fact that pin 90 and slots 112 or 114 remain interengaged, but is free to translate and rotate within the constraints imposed by pin 90 and slots 112 and 114.

When fluid under pressure is admitted to working chamber 108 through conduit 172 and fitting 110, inner pin 92 will be extended upwardly against the downwardly facing surface 182 of slots 112 and 114. If fixture 32 is moved such that its center hole 124 is positioned directly above inner pin 92, pin 92 will automatically extend upwardly into hole 124 and accurately locate fixture 132 for rotation about the rotation center defined by pin 92 and hole 124. Fixture 32 may then be rotated to the desired orientation relative to the tool 26 and pneumatic pressure to table 28 will automatically be interrupted through the action of pilot cylinder 166 thereby causing fixture 32 to come to rest on table 28. At this point, bayonet clamps 80 and 82 may be positioned and activated to securely lock fixture 32 in place for machining as shown in FIG. 1.

Figure 2:
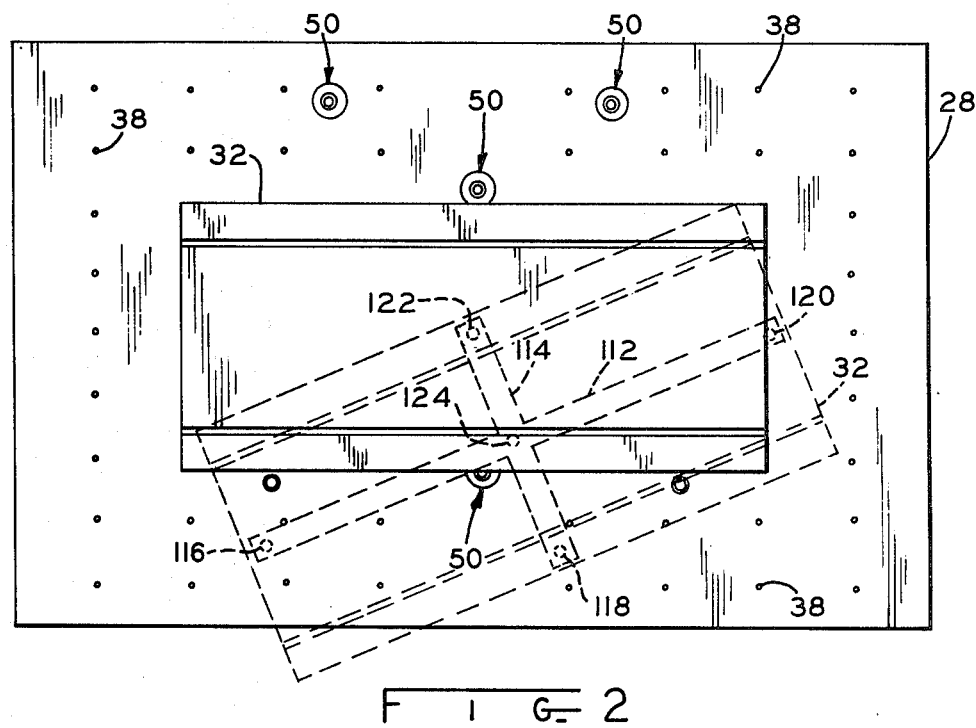
FIG. 2 is a top plan view of the table of FIG. 1 showing the workpiece fixture in two different positions.

Suppose that it is desired to rotate fixture 32 about another center. Clamps 80 and 82 are released and pneumatic pressure is again applied between the fixture and table surfaces 48 and 30 thereby causing fixture 32 to again float on a film of pressurized air. Pressure to chamber 108 is exhausted so that spring 102 causes inner pin 92 to be retracted out of center hole 124. Fixture 32 may then be translated with pin 90 received in slot 114. Assuming that inner pin 92 is again extended by applying fluid pressure to working chamber 108, it will urge against the downwardly facing surface 182 of slot 114 until hole 118, for example, comes into alignment with it at which point it will be extended upwardly. At this point, hole 118 becomes the new rotation center for fixture 32 as illustrated in FIG. 2. As described previously, the fixture 32 is accurately located in each desired machining position by means of locating pins 50 and sockets 62. If desired, only one pair of locating pins and sockets 50, 62 need be actuated because centering pins 90 and/or 92 can contribute to locating the fixture 32 and locking it against translation and rotation.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the limits of the appended claims.

What is claimed is:

1. In an apparatus for supporting a member having a table with a horizontal upper surface adapted to support a fixture thereon and means for supplying fluid under pressure between said table and the fixture supported thereon, a centering pin device comprising:
   an outer pin mounted within said table and projecting above said table upper surface,
   an inner pin being received within said outer pin for movement along a direction generally normal to said table surface, and
   means for selectively causing said inner pin to project above said outer pin at a first vertical position and alternatively for causing said inner pin to retract to a second vertical position below said first vertical position.

2. The apparatus of claim 1 wherein said pins are concentric and said inner pin is slidably received within said outer pin.

3. The apparatus of claim 2 wherein said means for selectively causing said inner pin to project and retract includes a fluid actuated piston.

4. The apparatus of claim 3 wherein said means for selectively causing said inner pin to project and retract includes a spring return means which acts in a reverse direction to said piston to return said inner pin to said first or second position when fluid pressure is removed from said piston.

5. The apparatus of claim 4 wherein said outer pin is slidably received in said table for rectlinear movement along said direction normal to said table surface and is urged upwardly by said spring return means.

6. The apparatus of claim 2 wherein said outer pin is slidably received in said table for rectlinear movement along said direction normal to said table surface.

7. The apparatus of claim 6 including means for interrupting the supply of fluid under pressure between said table and the fixture supported thereon when said outer pin is depressed below a given vertical height above said table surface.

8. The apparatus of claim 7 wherein said means for interrupting includes an electrical switch device which is actuated by said outer pin.

9. The apparatus of claim 7 wherein said means for interrupting includes:
   a plunger slidably received in said outer pin,
   switch means operatively connected to said means for supplying fluid and including a contact element positioned to be activated and deactivated by said plunger, and
   means for moving said plunger to activate said contact element when said outer pin is in said first vertical position and to deactivate said contact element when said outer pin is in said second vertical position,
   said switch means including means for causing fluid pressure to be supplied by said means for supplying when said contact element is actuated and for causing the fluid pressure to be interrupted when said contact element is deactivated.

10. The apparatus of claim 9 wherein an electrical ground is completed through said plunger when said contact element is activated.

11. The method of locating a fixture having a downwardly facing bottom surface, a slot in said bottom surface and a hole in said slot, in an apparatus having a table with an upwardly facing upper surface for supporting the fixture and a first pin extending upwardly out of the table surface, said method comprising:

supporting the fixture on the table with the table and fixture surfaces in facing relationship and with the pin received in the slot, supplying a fluid under pressure between the fixture and the table surfaces to provide substantially friction free support of the fixture on the table, causing a second pin having a smaller diameter than the first pin to project upwardly out of the first pin and urge against the fixture slot, moving the fixture on the table such that the slot slides over the first pin until the second pin engages the hole in the fixture, rotating the fixture about the second pin to a predetermined position on the table, and causing at least one pair of locating elements on the table and fixture surfaces to interengage so as to lock the fixture in said predetermined position on the table.

12. The method of claim 11 and causing a second pair of locating elements on the table and fixture surface to interengage.

13. The method of claim 11 wherein the first pin is slidably received in the table and including automatically interrupting the fluid supply between the fixture and table if the first pin is depressed by the fixture.

14. The method of claim 11 and automatically interrupting the fluid supply between the fixture and table if the first pin is not aligned with the fixture slot when the fixture is placed on the table.

15. The method of claim 11 wherein said apparatus is a machine tool, said fixture has a workpiece secured thereto, and said table is adapted to support the fixture in position for machining of the workpiece.

16. An apparatus for use in supporting a workpiece in a machine tool for the machining thereof comprising:

a table in the machine having an upwardly facing horizontal surface, a fixture having a downwardly facing lower surface resting on the upper surface of said table, said fixture being adapted for having a workpiece mounted thereon, means for supplying fluid under pressure between said surfaces for floatingly supporting said fixture on said table surface to permit substantially friction free movement of said fixture thereon, interengagement means on said surfaces interlocking said fixture and table for limiting horizontal translational movement of said fixture within predetermined limits, said interengagement means including a first element on said table surface adapted to interlock with a second element on said fixture surface, and means for automatically interrupting the supply of fluid under pressure between said surfaces whenever said fixture is supported on said table over said first element without said first and second elements being interlocked.

17. An apparatus for use in supporting a workpiece in a machine tool for the machining thereof comprising:

a. table in the machine having a upwardly facing horizontal surface, a fixture having a downwardly facing lower surface resting on the upper surface of said table, said fixture being adapted for having a workpiece mounted thereon, means for supplying fluid under pressure between said surfaces for floatingly supporting said fixture on said table surface to permit substantially friction free movement of said fixture thereon, said fixture surface having a slot therein and a downwardly facing hole in said slot, said slot having closed ends, translation pin means mounted within said table and projecting above said table surface at a first vertical level, said pin means at said first level being received within said slot and positioned at a level below said hole, rotation pin means received in said translation pin means for reciprocation along a direction generally normal to the surface of said table, and actuator means for selectively causing said rotation pin means to extend to a second vertical level above said first level and be received in said hole when said hole is positioned over said rotation pin means.

18. The apparatus of claim 17 including means for selectively retracting said rotation pin out of said hole thereby permitting translation of said fixture over said translation pin.

19. The apparatus of claim 18 wherein said pins are concentric and said rotation pin is slidably received in said translation pin.

20. The apparatus of claim 19 wherein said translation pin is slidably received in said table for axial rectlinear movement and further including means for interrupting the supply of fluid between said surfaces when said translation pin is depressed to a position below said slot.

21. The apparatus of claim 19 including spring means for urging said translation pin to project above said table surface.

22. The apparatus of claim 18 including a second slot in said fixture intersecting the first mentioned slot and adapted to receive said translation pin means, said second slot having closed ends.

23. The apparatus of claim 22 wherein said hole is located at the intersection of said slots.

* * * * *